United States Patent
Groen et al.

(10) Patent No.: US 6,852,946 B2
(45) Date of Patent: Feb. 8, 2005

(54) LASER-INDUCED PLASMA MICROMACHINING

(75) Inventors: Cale E. Groen, Bloomington, IL (US); Justin Lee Koch, Mossville, IL (US); William E. White, Los Gatos, CA (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 10/324,076

(22) Filed: Dec. 20, 2002

(65) Prior Publication Data

US 2004/0118823 A1 Jun. 24, 2004

(51) Int. Cl.⁷ .............................................. B23K 26/36
(52) U.S. Cl. .......................... 219/121.68; 219/121.69
(58) Field of Search .................. 219/121.6, 121.61, 219/121.67, 121.68, 121.69, 121.72, 121.78

(56) References Cited

U.S. PATENT DOCUMENTS

| | | | |
|---|---|---|---|
| 5,656,186 A | 8/1997 | Mourou et al. | |
| 5,800,625 A | * 9/1998 | Engelsberg et al. | 134/1 |
| 6,150,630 A | * 11/2000 | Perry et al. | 219/121.68 |
| RE37,585 E | 3/2002 | Mourou et al. | |

FOREIGN PATENT DOCUMENTS

WO  WO 95/27587  10/1995

* cited by examiner

*Primary Examiner*—Samuel M. Heinrich
(74) *Attorney, Agent, or Firm*—Finnegan, Henderson, Farabow, Garrett & Dunner

(57) ABSTRACT

A method and system for laser ablating a target material in an ambient atmosphere are disclosed. The method includes generating one or more laser pulses, each of the laser pulses having a pulse width of 1 picosecond (ps) or less and a pulse energy of 50 micro joules ($\mu J$) or more. The laser pulses are directed towards the target material such that the laser pulses interact with a gas to form a plasma. The plasma removes a portion of the target material by interaction of the plasma with the target material.

22 Claims, 3 Drawing Sheets

LASER-INDUCED PLASMA MICROMACHINING

TECHNICAL FIELD

The present invention relates to laser ablation and, more particularly, to apparatus and processes for micromachining by laser ablation.

BACKGROUND

Lasers are used in a variety of machining applications. In particular, continuous wave (CW) and long pulse width lasers have been used to cut, drill, surface modify, and mark target materials. Energy from an impinging laser beam or pulse typically beats a target material from a solid phase through a liquid phase to a vapor phase causing expansion and expulsion of target material.

Problems arise in micromachining, however, because laser micromachined materials typically require high precision and quality. For CW and long pulse width lasers, the distance over which the heat from the laser pulse is dispersed is greater than the absorption length of the laser. As a result, partial re-solidification of the melt zone can occur causing the formation of craters and heat-affected zones. Other problems include surface contamination and shock wave damage to adjacent material.

One solution is to use ultrashort pulse width lasers, such as, for example, pulses generated by femtosecond and picosecond lasers. Because ultrashort pulse width lasers deposit energy into a target material in a very short time interval, the distance over which the heat due to the laser is dispersed is less than the absorption length of the laser. Thus, material is removed before energy loss due to thermal diffusion can occur. U.S. Pat. No. 5,656,186 ("the '186 patent"), reissued as U.S. RE Pat. No. 37,585, discloses a method for ablating a feature smaller than the laser spot size using pulse widths less than one nanosecond and pulse energies on the order of 1 micro joule ($\mu$J). The '186 patent discloses plotting the relationship of the fluence threshold at which breakdown occurs versus the laser beam pulse width to determine a transition point at which the ablation threshold is highly dependent on pulse width. According to the '186 patent, when operating near this transition point a bulk of the pulse energy ionizes the target material to cause ablation. Because the bulk of the pulse energy ionizes the target material, micromachining at the fluence levels disclosed in the '186 patent may result in unacceptable precision and quality of the laser processed material.

Thus, there is a need to overcome these and other problems of the prior art and to provide methods and apparatus for laser micromachining. The present invention, as illustrated in the following description, is directed to solving one or more of the problems set forth above.

SUMMARY OF THE INVENTION

In accordance with an aspect of the present invention, a method for laser ablation is disclosed. The method includes providing a target material in an ambient atmosphere. One or more laser pulses are generated, each of the laser pulses having a pulse width of 1 picosecond (ps) or less and a pulse energy of 50 micro joules ($\mu$J) or more. The one or more laser pulses are directed towards the target material to interact with a provided gas to form a plasma at a surface of the target material. A portion of the target material is then removed by interaction of the plasma with the target material.

In accordance with another aspect of the present invention, a method for micromachining is disclosed. The method includes providing a metallic target material in an ambient atmosphere and generating a plurality of laser pulses. Each of the plurality of laser pulses has a fluence of 10–500 J/cm2. The plurality of laser pulses are directed to impinge the target material in a predetermined pattern. A gas is provided such that the plurality of laser pulses interact with the gas to form a plasma. The plasma then interacts with the target material to remove a portion of the target material.

In accordance with yet another aspect of the present invention, a method for forming an orifice in a fuel injector nozzle tip is disclosed. The method includes providing the fuel injector nozzle tip in an ambient atmosphere. A plurality of laser pulses are generated, each of the plurality of laser pulses having a pulse width of 1 ps or less and a fluence of 10–500 J/cm2. The plurality of laser pulses are directed to trepan the fuel injector nozzle tip. A gas is provided such that the plurality of laser pulses trepanning the target material interact with the gas to form a plasma. The orifice is then formed by removing a portion of the fuel injector nozzle tip by interaction of the plasma with a surface of the fuel injector nozzle tip.

In accordance with another aspect of the present invention, a system for micromachining is disclosed. The system includes a laser system to generate one or more laser pulses, each of the laser pulses has a pulse width of 1 ps or less and a pulse energy of 50 $\mu$J or more, and optical components to direct the one or more laser pulses towards a target material in an ambient atmosphere. The system further includes at least one lens to focus the one or more laser pulses to a minimum spot size at or below a surface of the target material. The system also includes a source of gas directed towards the surface of the target material such that the one or more laser pulses interact with the gas to form a plasma that removes a portion of the target material.

DETAILED DESCRIPTION

Figure 1:
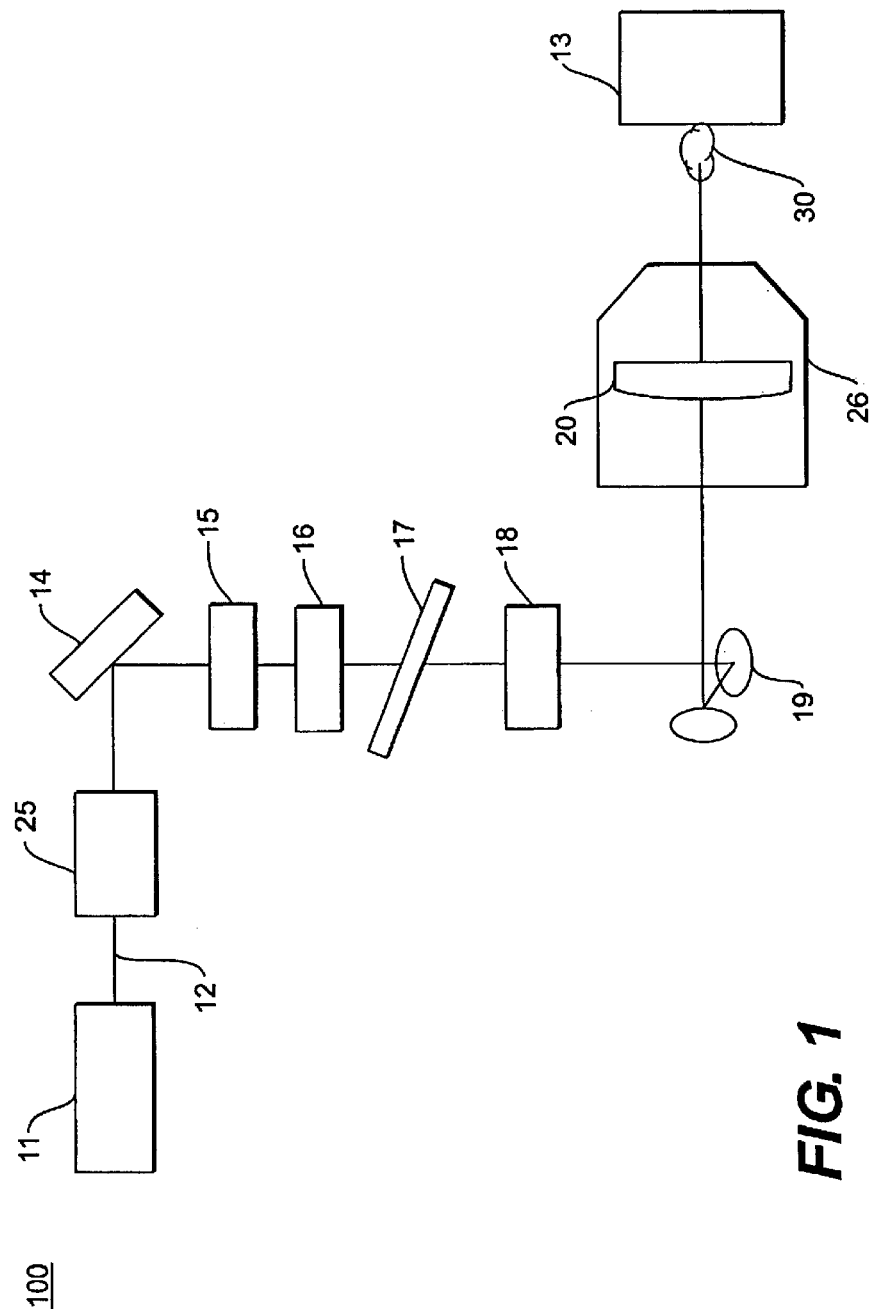
FIG. 1 is a diagrammatic representation of a system for laser ablation in accordance with an exemplary embodiment of the invention.

FIG. 1 depicts an exemplary system 100 for laser ablation. A laser system 11 can be any chirped pulse amplified laser system capable of generating pulses having pulse widths of 1 picosecond (ps) or less, such as, for example, femtosecond or picosecond laser systems using a Ti:Sapphire oscillator. Other examples of chirped pulse amplified laser systems include those using Nd:Glass, Yb:Glass, or hybrid oscillators. The generated pulses are directed along a path 12 towards a target material 13 by various optical components. The optical components along optical path 12 may include, for example, a mirror 14, a shutter 15, a ½ wave plate 16, a beam splitter 17, a ¼ wave plate 18, periscope mirrors 19, and a lens 20. A single shot autocorrelator 25 positioned in path 12 may also optionally be used to measure the pulse width. One of skill in the art will recognize that the optical system depicted in FIG. 1 is exemplary and that other configurations and optical components can be used without departing from the scope of the present invention.

Gas flow equipment 26 provides gas to a location near the surface of target material 13 upon which the laser pulses are focused. Gas flow equipment 26 may, for example, provide a concentric gas along the axis of the laser pulse path immediately prior to impingement of the target material. The gas can be, for example, air, helium, or argon having a flow rate of about 1 to 10 cubic feet per hour.

In an exemplary embodiment, target material 13 can be an inorganic material, such as, for example, a metal. Target material 13 can be in an ambient atmosphere, such as, for example, room temperature and pressure. Laser system 11 can be a femtosecond laser including a Ti:Sapphire oscillator operating at 1 KHz or more. Laser system 11 generates one or more pulses, each pulse having a laser energy of about 1/10 to 50 watts, and pulse width of about 1 ps or less.

Optical components direct the laser pulse or pulses along path 12. Lens 20 can be, for example, a 100 mm lens that focuses the pulse to a minimum spot size at or below the surface of target material 13. The minimum spot size can be about 10 to 50 microns and a fluence can be about 10 to 500 J/cm$^2$. The laser pulse or pulses induce the gas at the surface of target material 13 to form a plasma 30. Plasma 30 then interacts with target material 13 to remove a portion of the target material.

Figure 2:
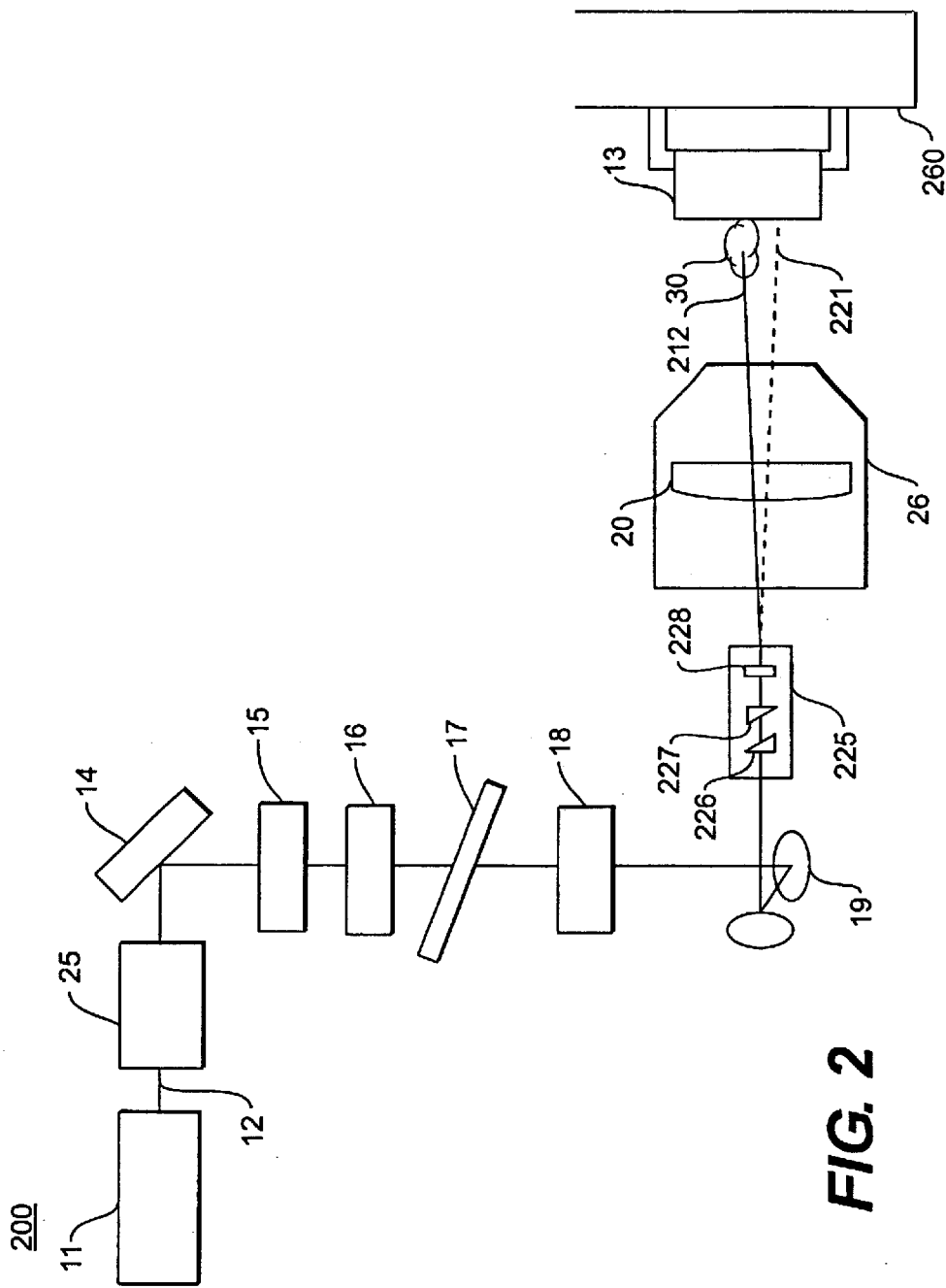
FIG. 2 is a diagrammatic representation of another system for laser ablation in accordance with an exemplary embodiment of the invention.

In another exemplary embodiment, laser pulses are used to generate a plasma to micromachine a desired structure from target material 13. FIG. 2 depicts a system 200 including similarly numbered laser system, optical components, and gas flow equipment as that depicted in FIG. 1. Laser system 200 further includes an apparatus such as trepan head 225 to direct the pulses to impinge target material 13 in a predetermined pattern represented by beam paths 212 and 221. Trepanning, for example, by moving the pulses in a circular path represented by line 212 and dotted line 221 can produce a hole having a greater diameter than that produced by fixed or stationary pulses. One of skill in the art will recognize that a circular hole is one example of a structure that can be produced by contour cutting and that other types of holes and structures can also be produced.

As the laser pulses trepan target material 13 along the circular path represented by line 212 and dotted line 221, the energy from the laser pulses interacts with the gas at the surface of target material 13 to form plasma 30. The plasma removes a circular portion of the target material forming the hole. Trepan head 225 includes a first optical wedge 226, a second optical wedge 227, and a ½ wave plate 228. Both optical wedges 226 and 227 may be rotated in the same direction at about, for example, 20 Hz to determine the diameter of the circular pulse path represented by line 212 and dotted line 221. Control of this ratio and, thus, the diameter of the beam path is typically automated by, for example, a servo-motor and computer.

Alternatively, target material 13 can be micromachined by moving target material in a predetermined pattern. A motion system 260 having, for example, 5-axis motion can move target material 13 in a predetermined pattern such that the laser pulses interact with the gas to form a plasma that micromachines a desired feature.

Figure 3:
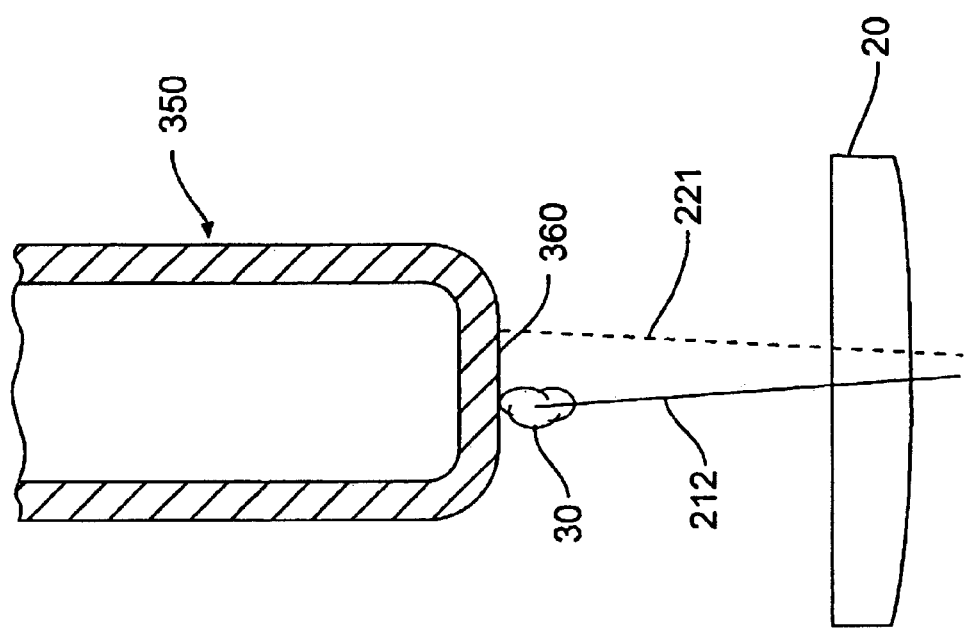
FIG. 3 is a diagrammatic cross-section illustrating fuel injector nozzle orifice formation by laser ablation in accordance with an exemplary embodiment of the invention.

FIG. 3 diagrammatically illustrates one particular application of the disclosed system to manufacture a fuel injector nozzle tip. This exemplary embodiment will be discussed in the following section.

The Industrial Applicability

An example of laser induced plasma micromachining according to the invention is the micromachining of an orifice in a fuel injector nozzle tip. Fuel injector nozzle tips can be made from a variety of alloy steels including, for example, AISI 52100. The thickness of the nozzle tip is about 500 μm to 2 mm and the orifice is about 25 to 500 μm in diameter. With reference to FIG. 2 depicting system 200, laser system 11 operates at about 1 KHz providing pulses with energies of about 100 to 400 μJ. Pulses are directed along path 12 by mirror 14, shutter 15, ½ wave plate 16, beam splitter 17, ¼ wave plate 18, periscope mirrors 19, and 100 mm lens 20.

Concentric gas can be provided by gas flow equipment 26 to a location adjacent the surface of the fuel injector nozzle tip upon which the laser pulses are focused. Gas flow of air, argon, or helium can be provided at about 1 to 10 cubic feet per hour.

Trepan head 225 operates the wedges at about 20 Hz to direct the laser pulses to trepan the fuel injector tip to form the orifice in the nozzle. As shown in FIG. 3, lens 20 focuses the pulses to a minimum spot size of about 10 to 50 μm at or below a surface 360 of fuel injector nozzle 350. The laser pulses, trepanning a circular path represented by line 212 and dotted line 221, interact with the gas at surface 360 of nozzle tip 350 to form plasma 30. Plasma 30 then removes a portion of material from surface 360 to form the orifice as the laser pulses trepan surface 360. Generally, fuel injector nozzle orifices having a diameter of 25 to 500 μm require about 10 to 100 joules/hole.

The disclosed laser ablation system and method have wide application in any industry that requires precision machining of small structures. Although the methods and systems can be utilized to ablate organic and inorganic materials, the present invention is particularly applicable to laser induced plasma micromachining of metals. It is known that the disclosed system and method provide improved precision and quality in the laser micromachining of orifices for fuel injector tips. This provides improved performance in the finished product and lessens manufacturing costs.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method for laser ablation comprising:
   providing a target material in an ambient atmosphere;
   generating one or more laser pulses, wherein each of the laser pulses has a pulse width of 1 picosecond (ps) or less and a pulse energy of 50 micro joules (μJ) or more;
   directing the one or more laser pulses towards the target material;
   providing a gas such that the one or more laser pulses interact with the gas to form a plasma at a surface of the target material; and
   removing a portion of the target material by interaction of the plasma with the target material.

2. The method of claim 1, wherein the gas is one of air, helium, and argon.

3. The method of claim 1, wherein the pulse width is about 100 to 1000 femtoseconds.

4. The method of claim 1, wherein each laser pulse provides a fluence of about 10 to 50 J/cm$^2$.

5. The method of claim 1, further including directing the one or more laser pulses to impinge the target material in a predetermined pattern.

6. The method of claim 1, further including moving the target material such that the one or more laser pulses impinge the target material in a predetermined pattern.

7. A method for micromachining comprising:
provyiding a metallic target material in an ambient atmosphere;
generating a plurality of laser pulses, wherein each of the plurality of laser pulses has a fluency of 10 to 500 J/cm$^2$;
directing the plurality of laser pulses to impinge the target material in a predetermined pattern;
providing a gas such that the plurality of laser pulses interact with the gas to form a plasma; and
removing a portion of the target material by interaction of the plasma with the target material.

8. The method of claim 7, wherein optical components direct the plurality of laser pulses to trepan the target material to form a circular hole.

9. The method of claim 7, wherein the gas is one of air, helium, and argon.

10. The method of claim 8, wherein the optical components include two optical wedges rotating at substantially a same speed and a ½ wave plate rotating at about half the speed of the optical wedges.

11. The method of claim 8, wherein the plurality of laser pulses have pulse width of 1 picosecond (ps) or less and a pulse energy of 50 μJ or more.

12. A method for forming an orifice in a fuel injector nozzle tip comprising:
providing the fuel injector nozzle tip in an ambient atmosphere;
generating a plurality of laser pulses, wherein each of the plurality of laser pulses has a pulse width of 1 ps or less and a fluence of 10 to 500 J/cm$^2$;
directing the plurality of laser pulses to trepan the fuel injector nozzle tip;
providing a gas such that the plurality of laser pulses trepanning the target material interact with the gas to form a plasma; and
forming the orifice by removing a portion of the fuel injector nozzle tip by interaction of the plasma with a surface of the fuel injector nozzle tip.

13. The method of claim 12, wherein the fuel injector nozzle includes an alloy steel.

14. The method of claim 12, wherein the orifice is 25 to 500 μm in diameter.

15. The method of claim 14, wherein the laser energy to form the orifice is 10 to 100 Joules.

16. A system for micromachining comprising:
a laser system generating one or more laser pulses, wherein each of the laser pulses has a pulse width of 1 ps or less and a pulse energy of 50 μJ or more;
optical components to direct the one or more laser pulses towards a target material;
at least one lens to focus the one or more laser pulses to a minimum spot size at or below a surface of a target material;
a source of gas directed towards the surface of the target material such that the one or more laser pulses interact with the gas to form a plasma, and wherein the plasma is capable of removing a portion of a target material.

17. The system of claim 16, further including optical components to direct the one or more laser pulses to trepan a target material.

18. The system of claim 16, wherein the source of gas flows at about 1 to 10 cubic feet per hour.

19. The system of claim 16, wherein the source of gas includes air, argon, or helium.

20. The system of claim 16, wherein the laser system is a chirped pulse amplified laser system.

21. The system of claim 16, wherein a fluence of each of the one or more laser pulses is 10 to 500 J/cm$^2$.

22. The system of claim 16, wherein the at least one lens focuses the one or more laser pulses to a minimum spot size of 10–50 μm.

* * * * *

UNITED STATES PATENT AND TRADEMARK OFFICE
CERTIFICATE OF CORRECTION

PATENT NO.   : 6,852,946 B2
DATED        : February 8, 2005
INVENTOR(S)  : Cale E. Groen et al.

It is certified that error appears in the above-identified patent and that said Letters Patent is hereby corrected as shown below:

<u>Column 6,</u>
Line 41, please insert:
-- 23. The system of claim 17, wherein the optical components include two optical wedges rotating at substantially a same speed and a ½ wave plate rotating at about half speed of the optical wedges. --

Signed and Sealed this

Fifth Day of July, 2005

JON W. DUDAS
*Director of the United States Patent and Trademark Office*